United States Patent
Numazaki et al.

(10) Patent No.: US 9,988,081 B2
(45) Date of Patent: Jun. 5, 2018

(54) STEERING SYSTEM

(71) Applicant: JTEKT CORPORATION, Osaka-shi, Osaka (JP)

(72) Inventors: Kazushi Numazaki, Toyota (JP); Ryouhei Hayama, Nabari (JP); Hideyuki Mukae, Nagakute (JP)

(73) Assignee: JTEKT CORPORATION, Osaka-shi (JP)

(*) Notice: Subject to any disclaimer, the term of this patent is extended or adjusted under 35 U.S.C. 154(b) by 81 days.

(21) Appl. No.: 15/257,474

(22) Filed: Sep. 6, 2016

(65) Prior Publication Data
US 2017/0073000 A1 Mar. 16, 2017

(30) Foreign Application Priority Data

Sep. 11, 2015 (JP) .................. 2015-179712

(51) Int. Cl.
*B62D 6/00* (2006.01)
*B62D 5/04* (2006.01)
*B62D 1/04* (2006.01)
*B62D 1/06* (2006.01)
*B62D 15/02* (2006.01)

(52) U.S. Cl.
CPC ................ *B62D 6/00* (2013.01); *B62D 1/04* (2013.01); *B62D 1/06* (2013.01); *B62D 5/0457* (2013.01); *B62D 15/025* (2013.01); *B60W 2510/20* (2013.01); *B60W 2710/20* (2013.01)

(58) Field of Classification Search
CPC .................................. B62D 6/00; B62D 1/04
See application file for complete search history.

(56) References Cited

U.S. PATENT DOCUMENTS

| | | | |
|---|---|---|---|
| 8,095,272 B2 | 1/2012 | Suzuki et al. | |
| 2002/0104705 A1* | 8/2002 | Kuhn, Jr. | ............... B60K 26/00 180/333 |
| 2008/0084110 A1* | 4/2008 | Suzuki | ................... B60T 7/042 303/146 |
| 2010/0181431 A1 | 7/2010 | Ishiba | |

(Continued)

FOREIGN PATENT DOCUMENTS

| | | |
|---|---|---|
| EP | 1612102 A1 | 1/2006 |
| EP | 1690774 A1 | 8/2006 |

(Continued)

OTHER PUBLICATIONS

Feb. 21, 2017 Extended Search Report issued in European Patent Application No. 16187782.4.

*Primary Examiner* — Jess Whittington
(74) *Attorney, Agent, or Firm* — Oliff PLC

(57) ABSTRACT

A steering system is provided which more appropriately alleviates driver's discomfort in the wrists. A steering ECU has an estimated grip angle calculating circuit, a deviation calculating circuit, an automatic steering torque command value calculating circuit, and a grip angle command value calculating circuit. The estimated grip angle calculating circuit calculates an estimated grip angle based on a steering angle. The deviation calculating circuit calculates a deviation based on the steering angle, a steering angle deviation, and the estimated grip angle. The grip angle command value calculating circuit calculates a grip angle command value that is a sum of a grip angle and the deviation.

6 Claims, 17 Drawing Sheets

(56) References Cited

U.S. PATENT DOCUMENTS

2012/0283894 A1* 11/2012 Naboulsi ............ B60R 11/0264
  701/1
2016/0334876 A1* 11/2016 Park ..................... G09G 5/12

FOREIGN PATENT DOCUMENTS

| JP | 2010-234936 A | 10/2010 |
| JP | 5369694 B2 | 12/2013 |
| JP | 2014-043147 A | 3/2014 |

* cited by examiner

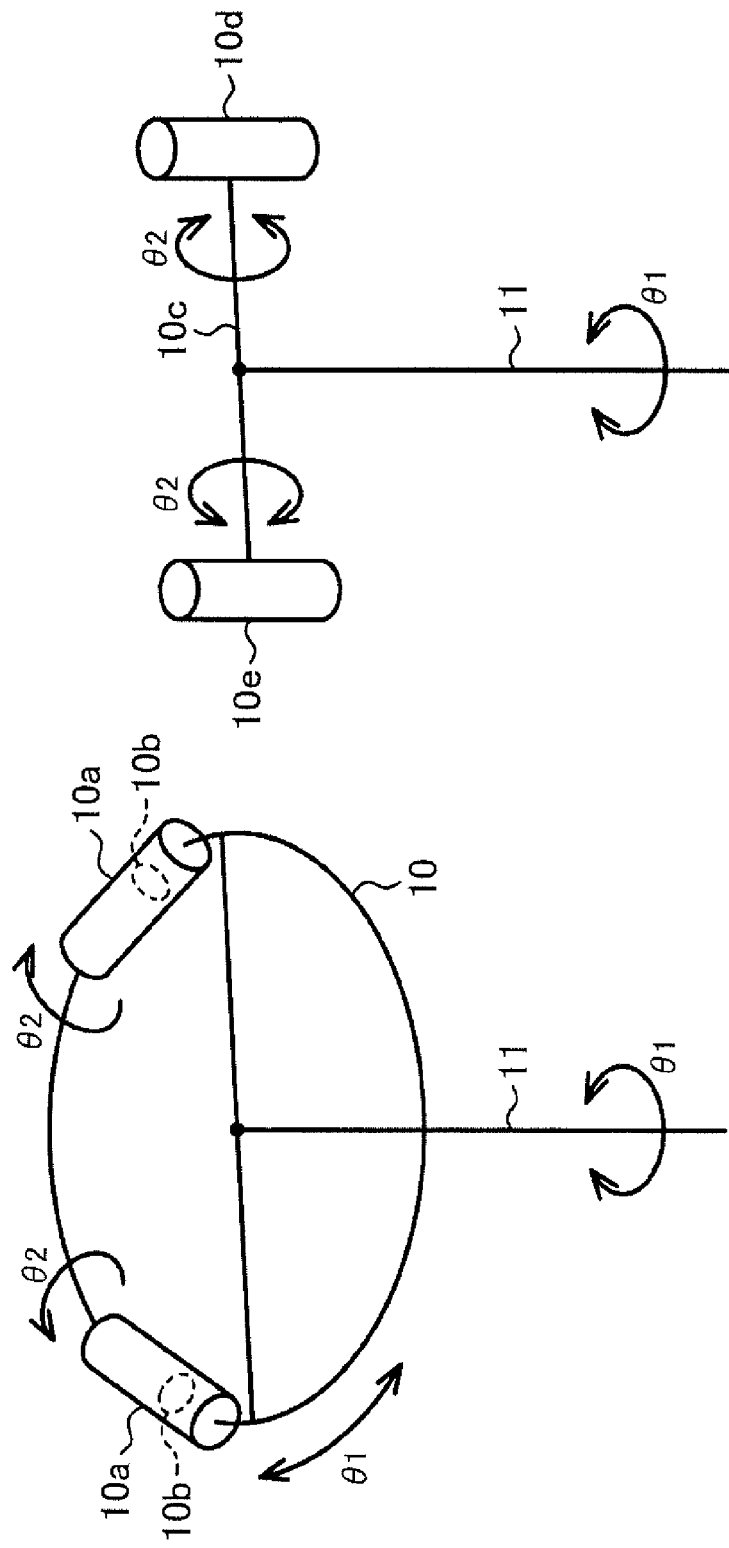

STEERING SYSTEM

INCORPORATION BY REFERENCE

The disclosure of Japanese Patent Application No. 2015-179712 filed on Sep. 11, 2015 including the specification, drawings and abstract, is incorporated herein by reference in its entirety.

BACKGROUND OF THE INVENTION

1. Field of the Invention

The invention relates to a steering system.

2. Description of the Related Art

In a steering system disclosed in Japanese Patent No. 5369694, a steering wheel (yoke) is provided with a grip that is a tool for exchanging driver's intention and system's intention between the driver and the system. When there may be a danger on an expected traveling path (the system's intension), an ECU in the steering apparatus vibrates the grip to notify the driver of the danger.

However, in the steering system in Japanese Patent No. 5369694, when the driver rotationally operates the steering wheel while gripping the grip, the driver's wrists have a sense of restraint as the steering wheel rotates. To alleviate this sense of restraint, the driver needs to take extra action by rotating the grip as the steering wheel rotates. When the steering angle of the steering wheel is changed by automatic steering control, the driver feels discomfort in the wrists, and thus, the driver needs to take extra action to alleviate the discomfort.

SUMMARY OF THE INVENTION

An object of the invention is to provide a steering system that more appropriately alleviates driver's discomfort in the wrists when the driver grips a grip.

According to an aspect of the present invention, a steering system includes a steering portion that is rotationally operated by a driver, a steering mechanism that varies a steered angle of steered wheels in conjunction with operation of the steering portion, a rotation angle sensor that detects a steering angle that is a rotation angle of the steering portion, a steering operation actuator that generates power applied to the steering mechanism to steer the steered wheels, a grip attached to the steering portion and having an axis of rotation that is non-parallel to an axis of rotation of the steering portion, a grip rotation angle sensor that detects a grip angle that is a rotation angle of the grip, a grip actuator that applies a rotational torque to the grip, and a control apparatus that performs automatic steering control that steers the steered wheels by controlling the steering operation actuator in accordance with a traveling state of a vehicle and the steering angle and grip control that rotates the grip by controlling the grip actuator in accordance with the steering angle and the grip angle. The control apparatus calculates, in performing the grip control during execution of automatic steering control, a grip angle command value that is a target value of the grip angle suitable for gripping of the grip based on the steering angle and the grip angle, and controls driving of the grip actuator so as to cause the grip angle to follow the grip angle command value.

In this configuration, the control apparatus calculates the grip angle command value suitable for gripping of the grip according to a change in the steering angle of the steering portion to cause the grip angle to follow the grip angle command value. This more appropriately alleviates discomfort felt when a driver grips the grip. Thus, the driver need not rotate the grip as the steering portion rotates, and burdens imposed on the driver are reduced.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 2A is a steering wheel and grips in the steering system in the first embodiment;

FIG. 2B is a steering wheel and grips in a steering system in another embodiment;

DETAILED DESCRIPTION OF EMBODIMENTS

Figure 1:
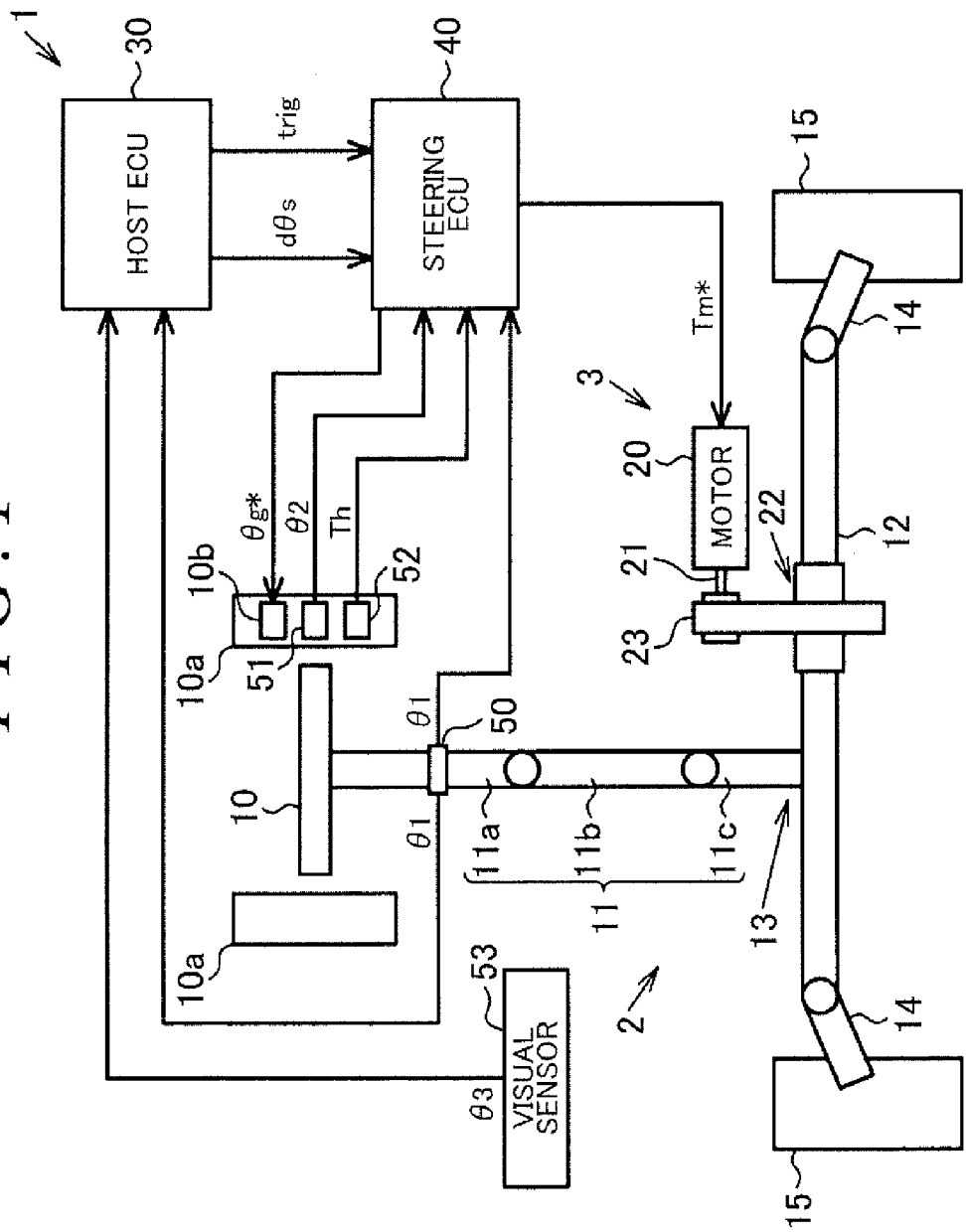
FIG. 1 is a diagram depicting a general configuration of a steering system in a first embodiment.

An embodiment of the invention will be described. As depicted in FIG. 1, an automatic steering system 1 includes a steering mechanism 2 that steers steered wheels 15 based on a driver's operation of a steering wheel 10, a steering operation actuator 3 that assists the driver's steering operation, a host ECU 30, and a steering ECU 40.

The steering mechanism 2 includes the steering wheel 10 and a steering shaft 11 that rotates integrally with the steering wheel 10. The steering shaft 11 has a column shaft 11a coupled to the steering wheel 10, an intermediate shaft 11b coupled to a lower end of the column shaft 11a, and a pinion shaft 11c coupled to a lower end of the intermediate shaft 11b. A lower end of the pinion shaft 11c is coupled to a rack shaft 12 via a rack-and-pinion mechanism 13. Therefore, in the steering mechanism 2, a rotational motion of the steering shaft 11 is converted into a reciprocating linear motion in an axial direction of the rack shaft 12 (a lateral direction in FIG. 1) via pinion teeth provided at a leading end of the pinion shaft 11c and the rack-and-pinion mechanism 13 that is rack teeth formed on the rack shaft 12. The reciprocating linear motion is transmitted to each of the right and left steered wheels 15 vial tie rods 14 coupled to respective opposite ends of the rack shaft 12 to vary the steered angle of the steered wheels 15.

The steering operation actuator 3 is provided on the rack shaft 12. The steering operation actuator 3 includes a motor 20 that is a source of a force that assists a steering operation, a ball screw mechanism 22 integrally attached around the rack shaft 12, and a reduction mechanism 23 that transmits a turning force of a rotating shaft 21 of a motor 20 to the ball screw mechanism 22. The steering operation actuator 3 converts the turning force of the motor 20 into reciprocating linear motion of the rack shaft 12 in the axial direction via the reduction mechanism 23 and the ball screw mechanism 22, and applies force in the axial direction to the rack shaft 12 to assist the driver's steering operation.

As depicted in FIG. 2A, the steering wheel 10 and the steering shaft 11 are attached together so as to be rotatable integrally with each other. Thus, an axis of rotation (first axis of rotation) of the steering wheel 10 is coaxial with an axis of rotation of the steering shaft 11. The steering angle of the steering wheel 10 is equal to a steering angle θ1 that is a rotation angle of the steering shaft 11.

The steering wheel 10 is provided with grips 10a and grip actuators 10b that apply a turning force to the respective grips 10a. The grips 10a are attached to portions of the steering wheel 10 that are gripped by the driver with both hands. The driver grips the steering wheel 10 via the grips 10a. The grips 10a are attached to the steering wheel 10 so as to be rotatable with respect to the steering wheel 10. An axis of rotation of each of the grips 10a is set non-parallel to the axes of rotation of the steering wheel 10 and the steering shaft 11. Each of the grips 10a rotates around an axis of rotation extending along a tangential direction of the steering wheel 10 (second axis of rotation). The first axis of rotation and the second axis of rotation are set non-parallel to each other and are different from each other. Each of the grip actuators 10b applies a turning force (rotational torque) to the corresponding grip 10a to change a grip angle θ2 of the grip 10a that is a rotation angle. As the grip actuators 10b, for example, motors are adopted. Each of the grips 10a is provided with a grip rotation angle sensor 51 and a grip torque sensor 52. The grip rotation angle sensor 51 detects the grip angle θ2 that is a rotation angle of the grip 10a. The grip torque sensor 52 detects a grip torque Th applied to the grip 10a in conjunction with the driver's grip operation.

As depicted in FIG. 1, the host ECU 30 generates a start trigger trig for the steering ECU 40 in order to perform automatic steering. The host ECU 30 also calculates a steered angle deviation dθs based on the steering angle θ1 and a yaw angle θ3 detected through a steering angle sensor 50 and a visual sensor 53.

The steering angle sensor 50 is provided on the column shaft 11a. The steering angle sensor 50 detects the steering angle θ1 that is a rotation angle of the steering shaft 11, which moves in conjunction with the driver's steering operation. For example, a camera is used as the visual sensor 53. The visual sensor 53 calculates the yaw angle θ3 based on loaded information on surroundings of the vehicle. The yaw angle θ3 is an angle (steered angle) of the steered wheels 15 with respect to a straight running direction of the vehicle and is indicative of, for example, a direction of the vehicle relative to a road.

The steering ECU 40 controls the motor 20 based on detection results from various sensors provided in the vehicle (the steering angle sensor 50 and the like) and the start trigger trig and the steering angle deviation dθs loaded from the host ECU 30. That is, based on outputs from the various sensors, the steering ECU 40 sets a target turning force and controls a current supplied to the motor 20 so as to make an actual turning force equal to the target turning force.

As depicted in FIG. 2A, when the driver simply grips the grips 10a without operation of the steering wheel, the driver hardly feels that gripping of the grips 10a is burdensome. This is because the driver does not feel discomfort in the wrists.

Figure 3B:
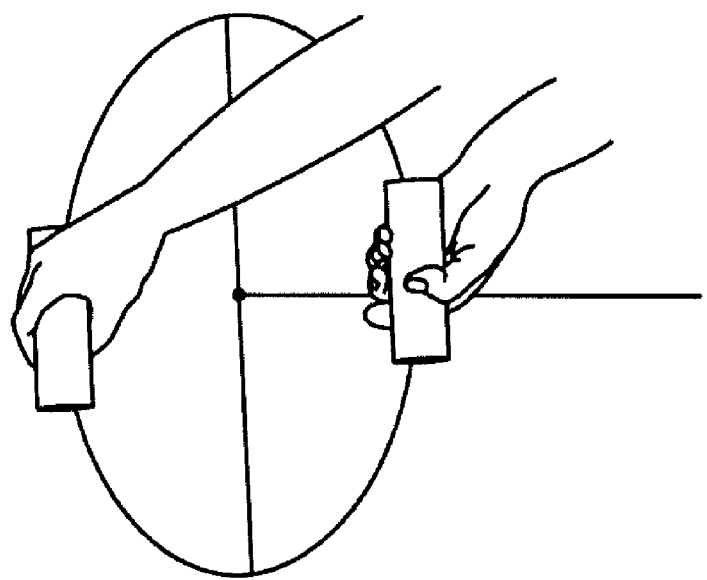
FIG. 3B is a schematic diagram depicting the grip state of the steering wheel and the grips in the steering system in the first embodiment.
Figure 3A:
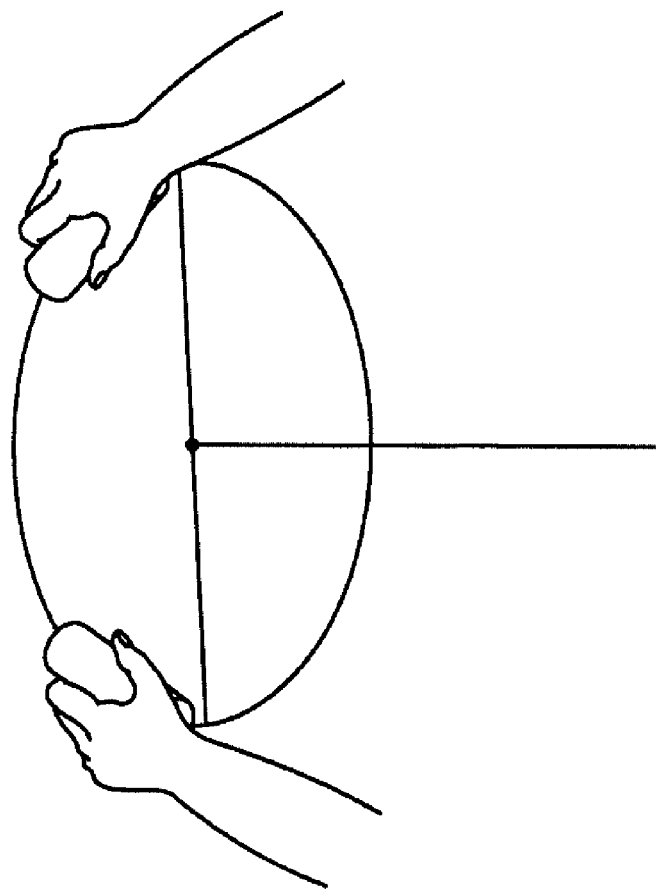
FIG. 3A is a schematic diagram depicting a grip state of the steering wheel and the grips in the steering system in the first embodiment.

However, as the steering wheel 10 is operated as depicted in FIG. 3B, gripping the grips 10a in the same manner as that in FIG. 2A is burdensome. This is because the driver feels discomfort in the wrists. The driver feels discomfort in the wrists not only when the driver operates the steering wheel 10 but also when the steering angle of the steering wheel 10 is changed by automatic steering control.

Thus, the steering ECU 40 controls the grip actuators 10b to rotate the grips 10a. The steering ECU 40 controls the grip actuators 10b so as to rotate the grips 10a in such a direction that the driver's discomfort in the wrists is alleviated, in conjunction with rotation of the steering wheel 10. That is, based on outputs from the various sensors (the steering angle sensor 50 and the visual sensor 53), the steering ECU 40 sets a target grip angle and controls the current supplied to the motor 20 so as to make the actual grip angle equal to the target grip angle. If a slight change in steering angle including zero occurs, the grip actuators 10b may be unexceptionally made freely rotatable without being driven. The free rotation can be achieved using a block signal generator (not depicted in the drawings) that, for example, forcibly turns off the start trigger, described below.

Now, the steering ECU 40 will be described in detail.

Figure 4:
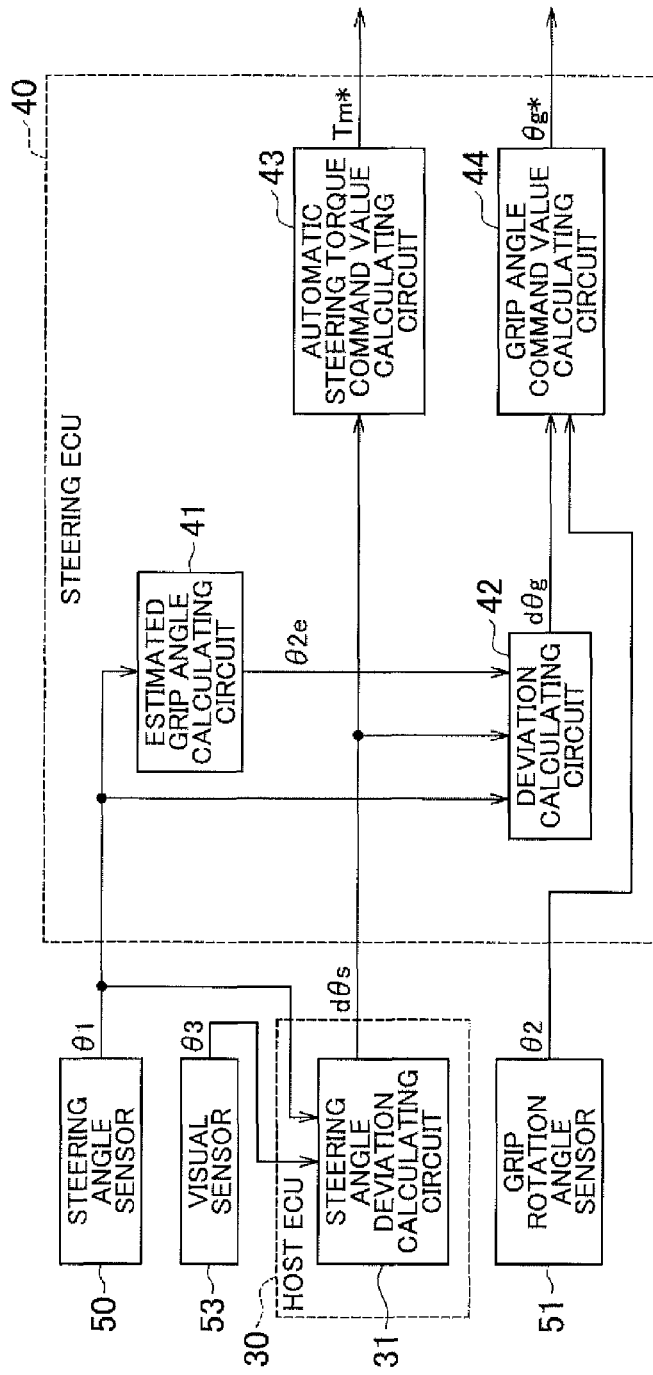
FIG. 4 is a block diagram depicting a general configuration of a steering ECU in the steering system in the first embodiment.

As depicted in FIG. 4, the steering ECU 40 has an estimated grip angle calculating circuit 41, a deviation calculating circuit 42, an automatic steering torque command value calculating circuit 43, and a grip angle command value calculating circuit 44. The host ECU 30 has a steering angle deviation calculating circuit 31 that calculates the steering angle deviation dθs. The steering angle deviation calculating circuit 31 calculates the steering angle deviation dθs based on the steering angle θ1 and the yaw angle θ3 detected through the steering angle sensor 50 and the visual sensor 53, respectively. The steering angle deviation dθs is a difference between the steering angle θ1 and the yaw angle θ3, or a difference between a target traveling path of the vehicle and an actual traveling path of the vehicle.

The estimated grip angle calculating circuit 41 calculates an estimated grip angle θ2e based on the steering angle θ1 detected through the steering angle sensor 50. The estimated grip angle θ2e is an appropriate grip angle corresponding to the steering angle θ1. The appropriate grip angle is a grip angle at which the driver can easily continue to grip the grips 10*a* even when the steering wheel 10 is steered.

The deviation calculating circuit 42 calculates a deviation dθg as a correction value. The deviation calculating circuit 42 loads the steering angle θ1 from the steering angle sensor 50, the steering angle deviation dθs from the steering angle deviation calculating circuit 31, and the estimated grip angle θ2*e* from the estimated grip angle calculating circuit 41. The deviation calculating circuit 42 calculates the deviation dθg based on the steering angle θ1, the steering angle deviation dθs, and the estimated grip angle θ2*e*. Even when the driver's discomfort in the wrists changes as a result of a change in the steering angle θ1, preferably the driver continues to easily grip the grips 10*a* and rotating the wrists to alleviate the discomfort is suppressed. Thus, the deviation dθg that is a difference value between the grip angle θ2 and a grip angle command value θg* is calculated so that the current grip angle θ2 is changed to a target grip angle (to be exact, the grip angle command value θg*) that is sufficient for alleviating the driver's discomfort in the wrists.

The automatic steering torque command value calculating circuit 43 calculates an automatic steering torque command value Tm* that is a command value for a torque to be applied by the motor 20 during automatic steering based on the steering angle deviation dθs. Specifically, as expressed by Expression (1), the automatic steering torque command value calculating circuit 43 multiplies the steering angle deviation dθs by a preset coefficient (a) to determine the automatic steering torque command value Tm*.

$$Tm^* = a \cdot d\theta s \quad (1)$$

The grip angle command value calculating circuit 44 calculates the grip angle command value θg* based on the grip angle θ2 and the deviation dθg. The grip angle command value θg* is a target value used when the grip actuators 10*b* change the grip angle θ2 of the grips 10*a*. Specifically, the grip angle command value θg* is calculated in accordance with Expression (2).

$$\theta g^* = \theta 2 + d\theta g \quad (2)$$

To be exact, the grip angle command value θg* is input to a current command value calculating circuit not depicted in the drawings, so that feedback control that makes the actual grip angle θ2 closer to the grip angle command value θg*. A current command value resulting from the feedback control is generated, and a current corresponding to the current command value is supplied to the grip actuators 10*b*.

Now, the calculation of the estimated grip angle θ2*e* executed in the estimated grip angle calculating circuit 41 will be described in detail. As depicted in a graph in FIG. 5, the estimated grip angle calculating circuit 41 selects one of a plurality of curves indicative of a relation between the steering angle θ1 and the estimated grip angle θ2*e* that are pre-mapped to each other, and calculates the estimated grip angle θ2*e* based on the selected curve. The curve is characterized in that the estimated grip angle θ2*e* monotonically and exponentially increases as the steering angle θ1 increases. For example, when a curve depicted by a continuous line is selected, the estimated grip angle θ2*e* is calculated to be an estimated grip angle θ2*ea* when the steering angle θ1 detected through the steering angle sensor 50 is a steering angle θ1*a*. For the curve indicative of the relation between the steering angle θ1 and the estimated grip angle θ2*e* that are mapped to each other, an optimum curve is selected in accordance with, for example, vehicle velocity and the driver's physique. For example, when the driver has a stronger physique, a curve with a large gradient (a left curve in FIG. 5) is selected.

Now, the calculation of the deviation dθg executed in the deviation calculating circuit 42 will be described in detail. As depicted in a graph in FIG. 6, the deviation calculating circuit 42 calculates the deviation dog by use of the curve selected from the graph in FIG. 5. In the graph in FIG. 6 as well, the steering angle θ1 is plotted on the axis of abscissas, and the estimated grip angle θ2*e* is plotted on the axis of ordinate. A difference is present between the target traveling path of the vehicle and the actual traveling path of the vehicle, and thus, the deviation calculating circuit 42 calculates a target steering angle θs by adding the steering angle θ1 and the steering angle deviation dθs together. The target steering angle θs is plotted on the axis of abscissas. The deviation calculating circuit 42 calculates a target grip angle θs by finding a grip angle corresponding to the target steering angle θs in the selected curve. The deviation calculating circuit 42 calculates the deviation dθg, which is a difference between the target grip angle θg and the estimated grip angle θ2*e*, as expressed by Expression (3).

$$d\theta g = \theta g - \theta 2e \quad (3)$$

Now, a process procedure for grip control performed in the steering ECU 40 will be described. As depicted in a flowchart in FIG. 7A, first, the steering ECU 40 determines whether or not the start trigger trig has been loaded (step S1). If the start trigger trig has not been loaded (in step S1, NO), step S1 is repeated until the start trigger trig is loaded. If the start trigger trig has been loaded (in step S1, YES), the steering ECU 40 loads the steering angle θ1, the grip angle θ2, and the steering angle deviation dθs (step S2).

Next, the steering ECU 40 determines whether or not the absolute value of the steering angle deviation dθs is larger than a threshold (step S3). The threshold is set to a value that is sufficient for determining that the target traveling path of the vehicle and the actual traveling path of the vehicle evidently deviate from each other. The absolute value of the steering angle deviation dθs and the threshold are compared with each other to determine a magnitude relation between the absolute value and the threshold because the deviation dθg need not be calculated when the target traveling path of the vehicle and the actual traveling path of the vehicle have no difference therebetween and substantially match each other.

If the absolute value of the steering angle deviation dθs is larger than the threshold (in step S3, YES), the steering ECU 40 (estimated grip angle calculating circuit 41) loads the steering angle θ1 and calculates the estimated grip angle θ2*e* (step S4).

The steering ECU 40 (deviation calculating circuit 42) calculates the deviation dθg based on the loaded steering angle θ1, steering angle deviation dθs, and the estimated grip angle θ2*e* (step S5).

Finally, the steering ECU 40 (grip angle command value calculating circuit 44) calculates the grip angle command value θg* (step S6). The grip angle command value θg* is the sum of the grip angle θ2 and the deviation dθg. The deviation dθg is calculated based on a change in the steering angle θ1, a change in the estimated grip angle θ2*e*, which is the grip angle estimated based on the steering angle θ1, and a change in the steering angle deviation dθs, which is calculated based on the difference between the target traveling path of the vehicle and the actual traveling path of the vehicle. Calculating the grip angle command value θg* allows the grip angle θ2 to be changed according to a change in the steering angle θ1. When the grip actuators 10b are controlled so as to make the grip angle θ2 closer to the grip angle command value θg*, changes in the grip angle θ2 are suppressed which result from operation of the grips 10a unintended by the driver.

If the absolute value of the steering angle deviation dθs is not larger than the threshold (in step S3, NO), the steering ECU 40 (deviation calculating circuit 42) zeroes the deviation dθg (step S7). If the absolute value of the steering angle deviation dθs is smaller than the threshold, the target traveling path of the vehicle and the actual traveling path of the vehicle substantially match each other. In this case, the target traveling path of the vehicle and the actual traveling path of the vehicle are considered to deviate from each other due to vibration of the hands or slight vibration caused by reverse input from a road surface. Consequently, the deviation dθg need not be calculated.

The steering ECU 40 (grip angle command value calculating circuit 44) then calculates the grip angle command value θg* (step S6) to end the processing. Since the grip angle command value θg* is calculated by adding the grip angle θ2 and the deviation dθg together, the grip angle command value θg* is equal to the grip angle θ2. Thus, the grip angle θ2 remains unchanged.

Figure 7A:
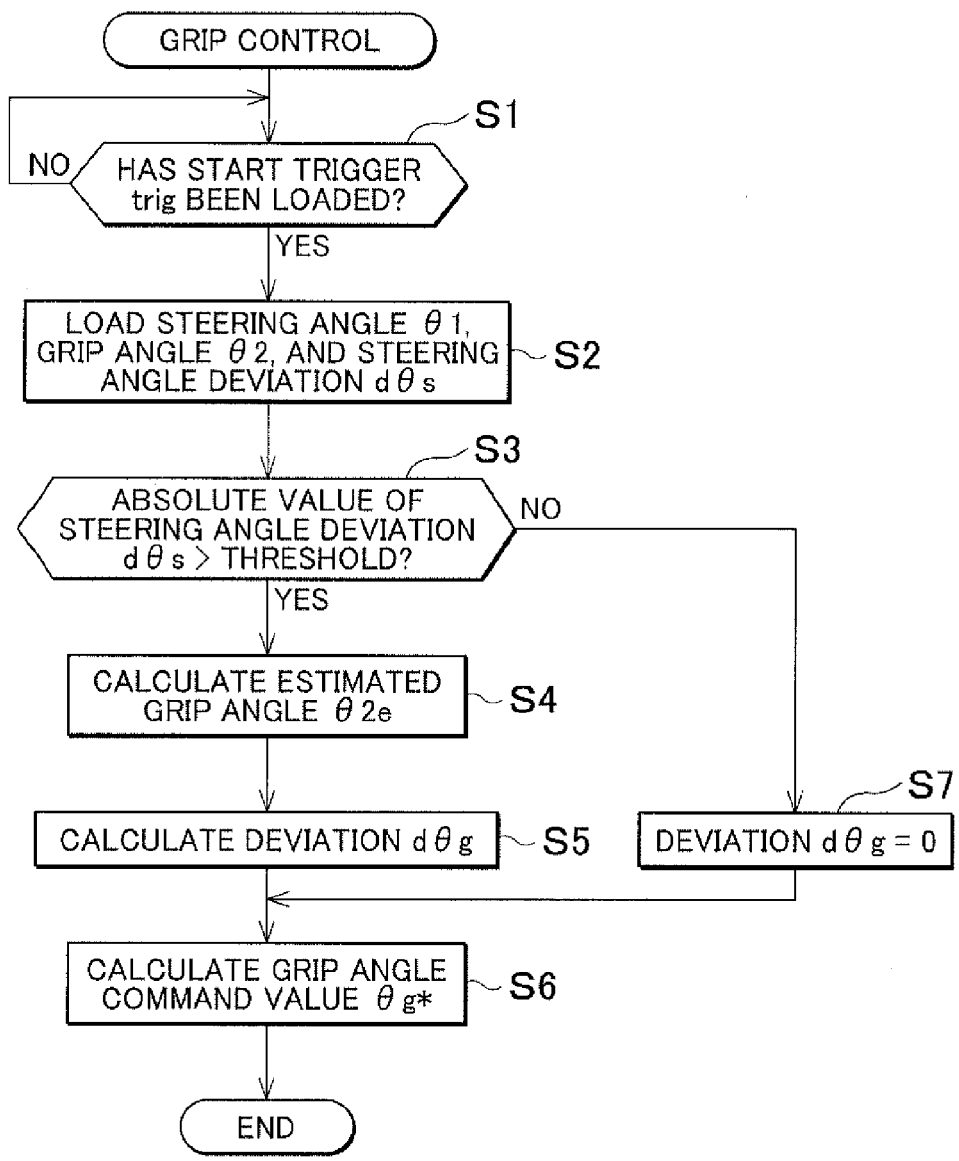
FIG. 7A is a flowchart illustrating a control procedure for grip control in the steering system in the first embodiment.

Processing illustrated in the flowchart in FIG. 7A is repeatedly executed. Now, a process procedure for automatic steering control performed in the steering ECU 40 will be described.

Figure 7B:
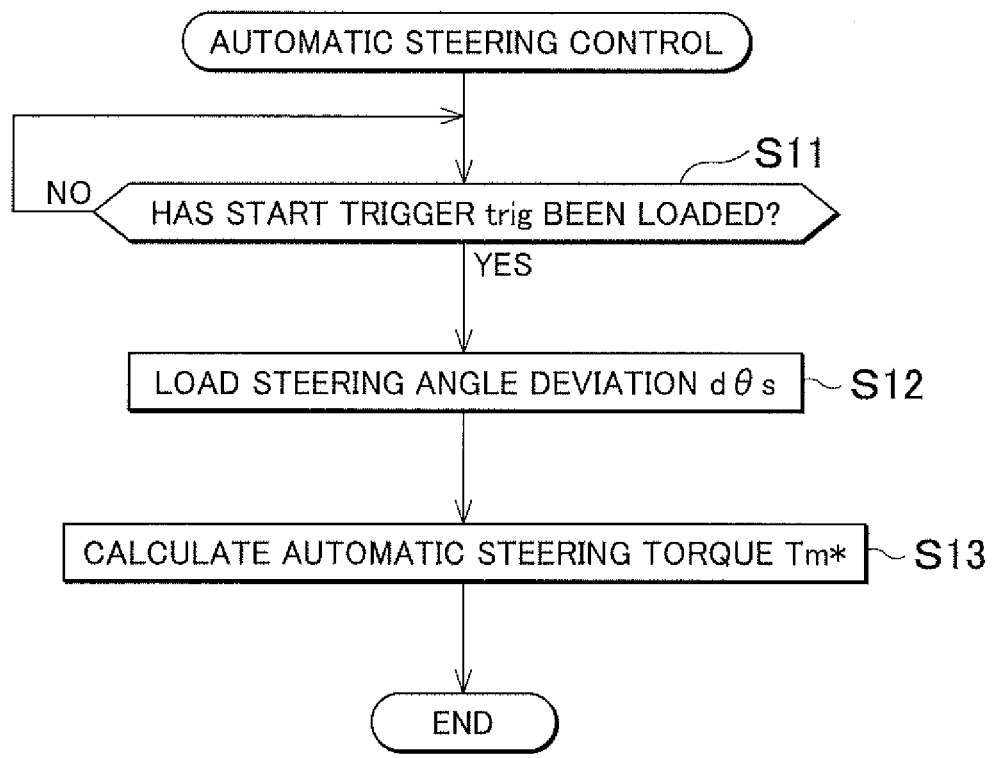
FIG. 7B is a flowchart illustrating a control procedure for automatic steering control in the steering system in the first embodiment.

As illustrated in the flowchart in FIG. 7B, first, the steering ECU 40 determines whether or not the start trigger trig has been loaded (step S11). If the start trigger trig has not been loaded (in step S11, NO), step S11 is repeated until the start trigger trig is loaded. If the start trigger trig has been loaded (in step S11, YES), the steering ECU 40 loads the steering angle deviation dθs (step S12), The steering ECU 40 calculates the automatic steering torque command value Tm* (step S13).

Effects of the present embodiment will be described.

(1) The steering ECU 40 varies the grip angle θ2 of the grips 10a according to a variation in the steering angle θ1 of the steering wheel 10. Consequently, even when the driver continuously grips the grips 10a at the same positions, the discomfort in the wrists is alleviated. Thus, even when steering the steering wheel 10 while gripping the grips 10a, the driver need not re-hold or rotate the grips 10a in order to alleviate the discomfort. Thus, burdens on the driver are reduced.

In the present embodiment, while the grips 10a are not operated, the automatic steering is continued by calculating the automatic steering torque command value Tm*. (2) The steering ECU 40 performs control that makes the grip angle θ2 closer to the grip angle command value θg*. This eliminates the need for the driver to operate the grips 10a in order to alleviate the driver's discomfort in the wrists. For example, although the driver feels discomfort in the wrists as the driver steers the steering wheel 10, the grip angle θ2 automatically varies according to a variation in the steering angle θ1 so as to alleviate the driver's discomfort in the wrists, enabling a reduction in burdens involved in adjustment of the grip angle θ2.

(3) The grip angle command value calculating circuit 44 calculates the grip angle command value θg* by adding the grip angle θ2 and the deviation dθg together. Consequently, the grips 10a can constantly be controlled via a certain grip angle command value θg*. For example, if the grip angle command value θg* is calculated using only the deviation dθg, when the difference between the grip angle θ2 and the estimated grip angle θ2e and the deviation dθg offset each other, a command value used to control the grip angle θ2 may be calculated to be zero in spite of the presence of the steering angle deviation dθs.

Now, a second embodiment of the steering system will be described. The automatic steering system 1 in the present embodiment is basically configured similarly to the automatic steering system 1 in the first embodiment depicted in FIG. 1. Mostly differences from the first embodiment will be described. In the second embodiment, what is called override processing is executed in which automatic steering and manual steering coexist as a result of intervention of the driver's operation during the automatic steering.

Figure 8:
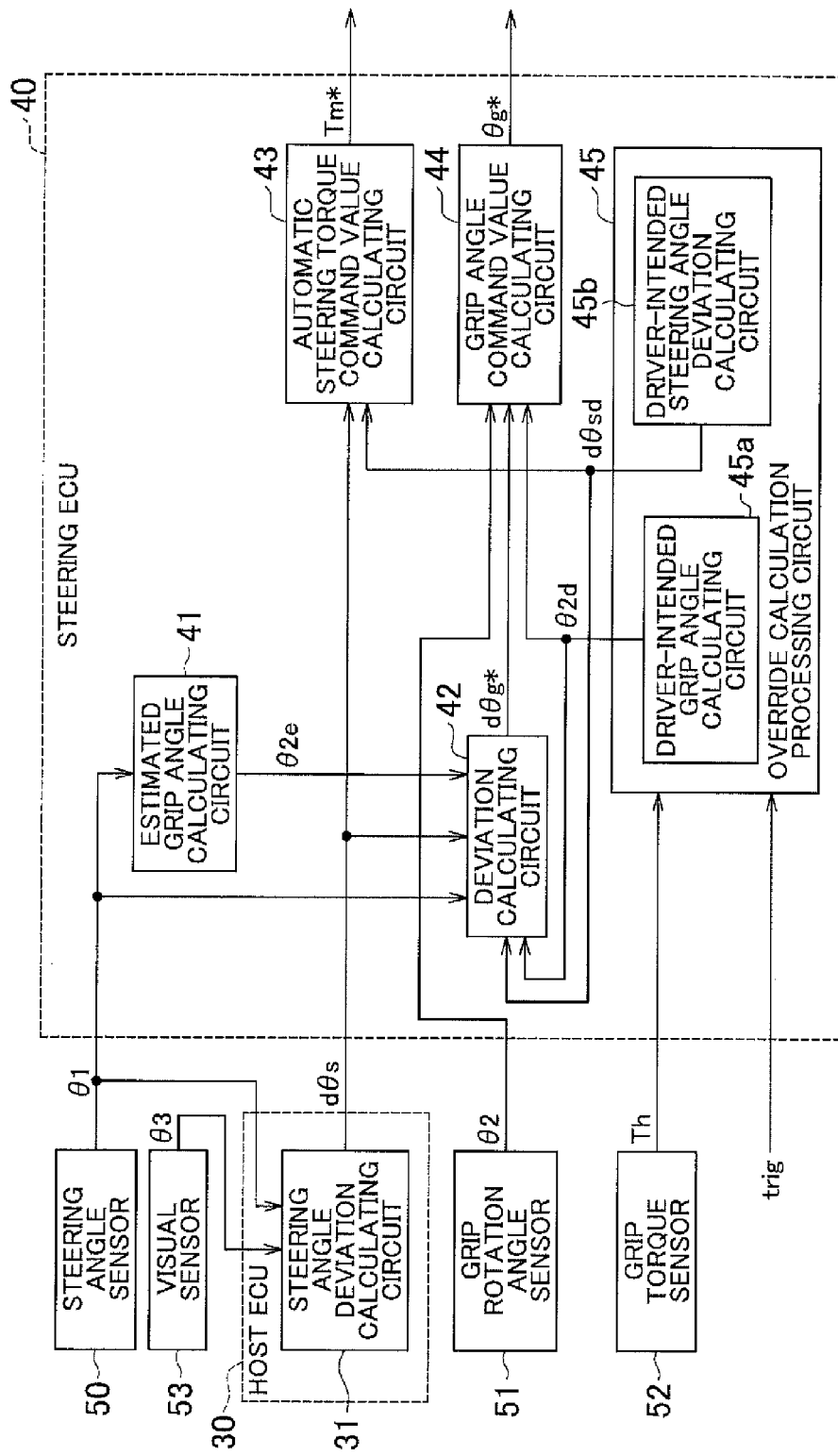
FIG. 8 is a block diagram depicting a general configuration of a steering ECU in a steering system in a second embodiment.

As depicted in FIG. 8, the steering ECU 40 has an override calculation processing circuit 45 in addition to the estimated grip angle calculating circuit 41, the deviation calculating circuit 42, the automatic steering torque command value calculating circuit 43, and the grip angle command value calculating circuit 44. The override calculation processing circuit 45 is provided to perform the automatic steering with the driver's intension (for example, preferences) taken into account.

Figure 9:
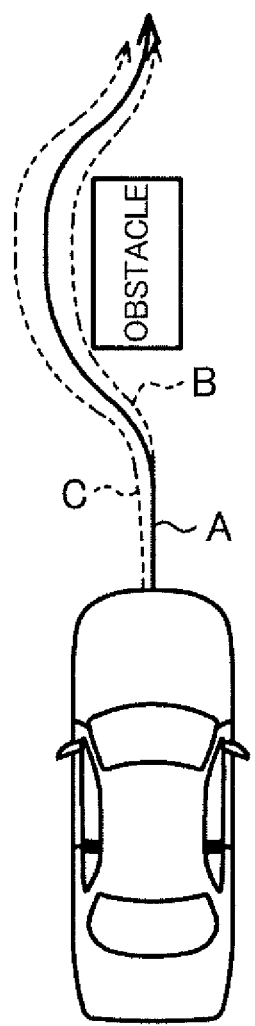
FIG. 9 is a schematic diagram of override processing in the second embodiment.

As depicted in FIG. 9, for example, in automatic steering that allows the vehicle to avoid colliding against an obstacle, the host ECU 30 tries to follow a path A depicted by a continuous line to avoid a collision between the vehicle and the obstacle. However, the driver may desire to avoid the obstacle by following a path B depicted by a dashed line or a path C depicted by a dashed line. The driver's intension in following the path B is considered to be the desire to minimize protrusion into an adjacent lane in avoiding the obstacle. The driver's intention in tracking the path C is considered to be the desire to avoid the obstacle with a sufficient distance between the vehicle and the obstacle. Thus, override calculation processing is executed to perform automatic steering that more appropriately reflects the driver's intension.

As depicted in FIG. 8, the override calculation processing circuit 45 has a driver-intended grip angle calculating circuit 45a and a driver-intended steering angle deviation calculating circuit 45b. The driver-intended grip angle calculating circuit 45a calculates a driver-intended grip angle θ2d based on the grip torque Th detected through the grip torque sensor 52.

Figure 10:
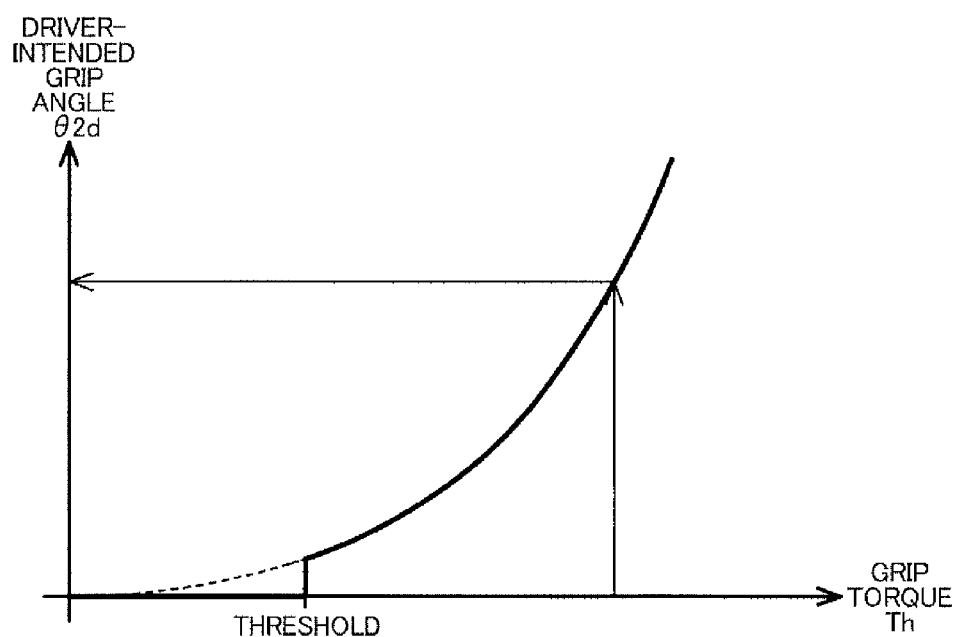
FIG. 10 is a graph illustrating a relation between a grip torque and a driver-intended grip angle.

As depicted in a graph in FIG. 10, the driver-intended grip angle θ2d increases as the grip torque Th increases. Based on this relation, the driver-intended grip angle θ2d corresponding to the grip torque Th is calculated. When the grip torque Th is higher than a threshold, the grip torque Th and the driver-intended grip angle θ2d have a monotonical-increasing proportional relation as depicted by a continuous line in FIG. 10. By way of example, the grip torque Th and the driver-intended grip angle θ2d have a relation in which the driver-intended grip angle θ2d exponentially increases as the grip torque Th increases. When the grip torque Th is lower than the threshold, the grip torque Th and the driver-intended grip angle θ2d originally have a monotonical-increasing proportional relation as depicted by a dashed line in FIG. 10. However, in the present embodiment, when the grip torque Th is smaller than the threshold, the driver-intended grip angle θ2d is constantly zero regardless of the grip torque Th as depicted by a continuous line in FIG. 10. The grip torque Th is represented in the form of an absolute value.

The driver-intended steering angle deviation calculating circuit 45b calculates a driver-intended steering angle deviation dθsd based on the grip torque Th detected through the grip torque sensor 52.

Figure 11:
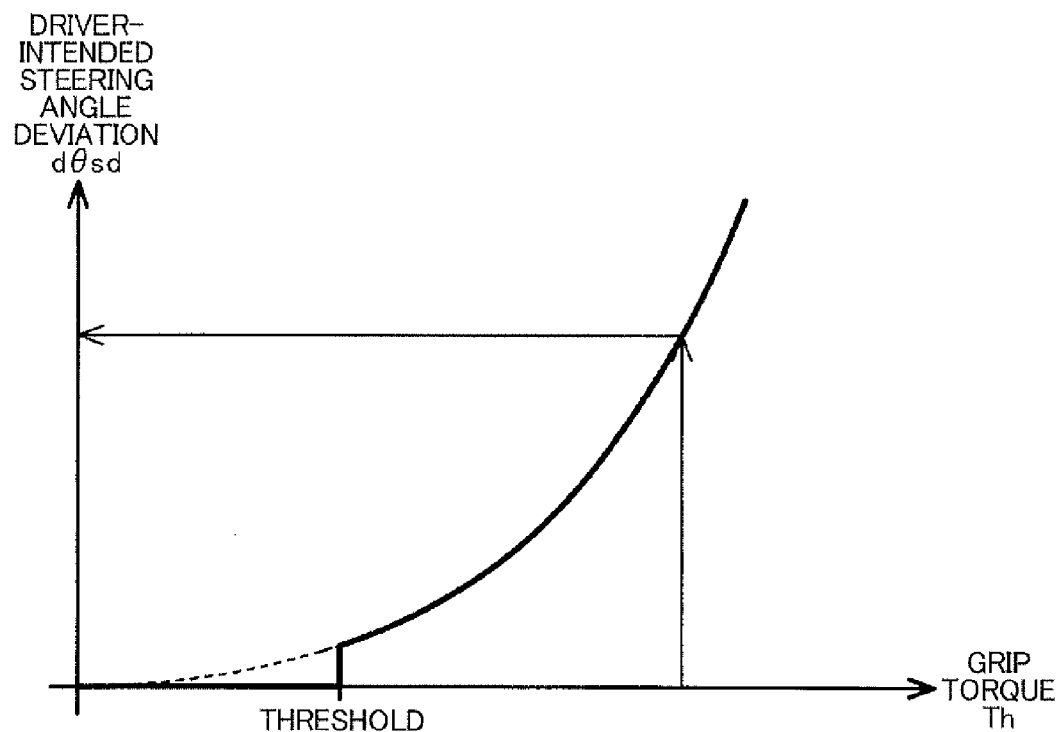
FIG. 11 is a graph illustrating a relation between the grip torque and a driver-intended steering angle deviation.

As depicted in a graph in FIG. 11, the driver-intended steering angle deviation dθsd increases as with the grip torque Th increases. When the grip torque Th is higher than the threshold, the grip torque Th and the driver-intended steering angle deviation dθsd have a monotonical-increasing proportional relation as depicted by a continuous line in FIG. 11. By way of example, the grip torque Th and the driver-intended steering angle deviation dθsd have a relation in which the driver-intended steering angle deviation dθsd exponentially increases as the grip torque Th increases. When the grip torque Th is lower than the threshold, the driver-intended steering angle deviation dθsd is zero regardless of the grip torque Th as depicted by a continuous line in FIG. 11. The grip torque Th is represented in the form of an absolute value.

Figure 12:
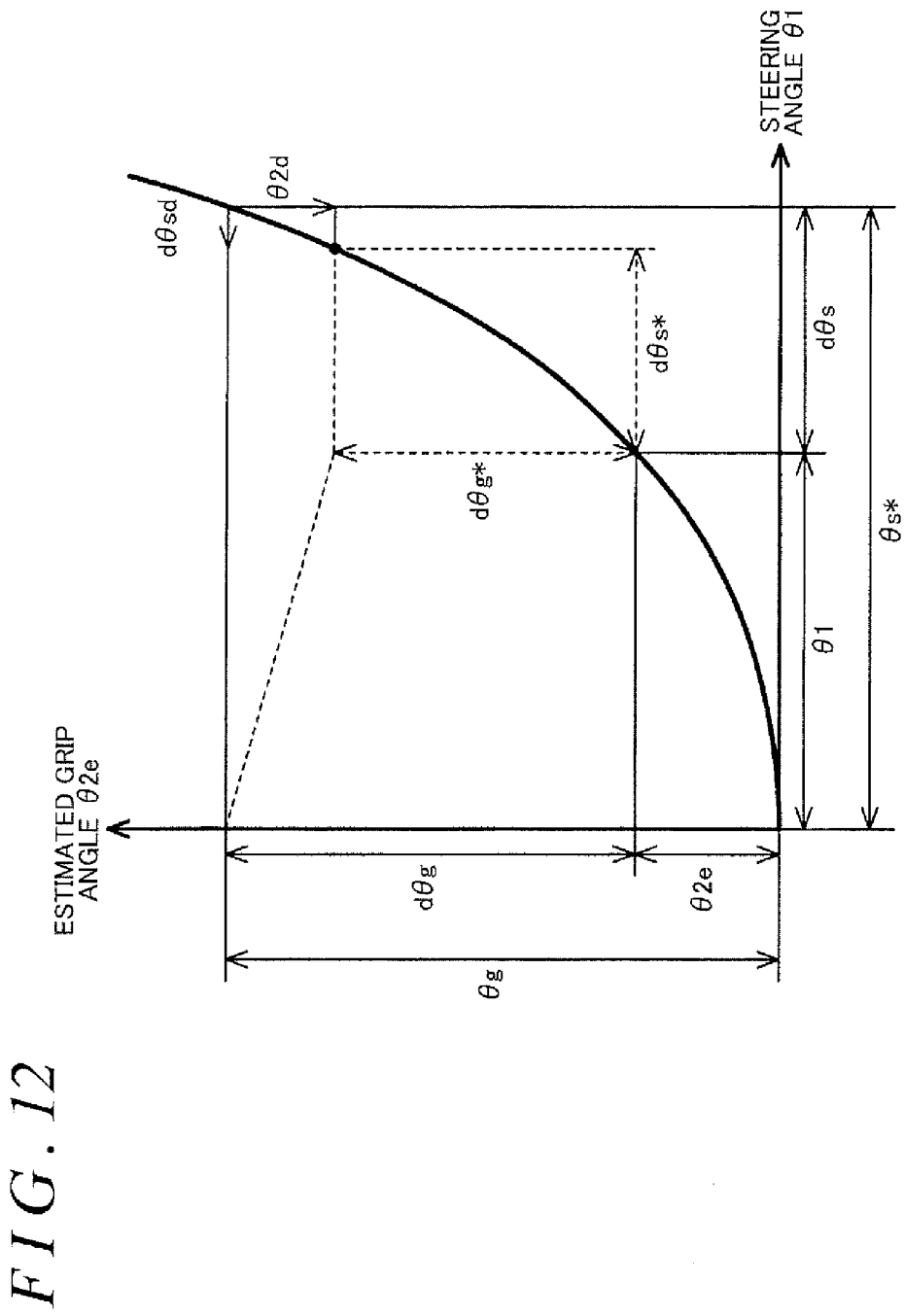
FIG. 12 is a graph used to calculate a corrected deviation in the steering system in the second embodiment.

Now, the calculation of the deviation dθg* executed in the deviation calculating circuit 42 will be described. As depicted in FIG. 12, the deviation calculating circuit 42 calculates the deviation dθg* based on the steering angle θ1, the driver-intended grip angle θ2d, the driver-intended steering angle deviation dθsd, the steering angle deviation dθs, and the estimated grip angle θ2e. First, the deviation calculating circuit 42 executes processing similar to the processing illustrated in FIG. 6 for the first embodiment to calculate the target grip angle θg corresponding to the target steering angle θs and to calculate the deviation dθg from the difference between the target grip angle θg and the estimated grip angle θ2e. To reflect the driver's intension, the deviation calculating circuit 42 further corrects the deviation dθg using the driver-intended grip angle θ2d and the driver-intended steering angle deviation dθsd.

Specifically, when the steering direction of the automatic steering is opposite to the driver's steering direction (for example, the path B in FIG. 9), the deviation calculating circuit 42 calculates a corrected deviation dθg* by taking the difference between the deviation dθg and the driver-intended grip angle θ2d. Thus, the corrected deviation dθg* is expressed by Expression (4). A graph in FIG. 12 illustrates this case.

$$d\theta g^* = \theta g - \theta 2e - \theta 2d \quad (4)$$

When the steering direction of the automatic steering is the same as the driver's steering direction (for example, the path C in FIG. 9), the deviation calculating circuit 42 calculates a corrected deviation dθg* by taking the sum of the deviation dθg and the driver-intended grip angle θ2d. Thus, the corrected deviation dθg* is expressed by Expression (5).

$$d\theta g^* = \theta g - \theta 2e - \theta 2d \quad (5)$$

The deviation calculating circuit 42 further calculates a corrected steering angle deviation dθs* by taking the sum of or the difference between the steering angle deviation dθs and the driver-intended steering angle deviation dθsd.

The automatic steering torque command value calculating circuit 43 calculates the automatic steering torque command value Tm*, which is a command value for a torque to be applied by the motor 20 for the automatic steering, based on the steering angle deviation dθs and the driver-intended steering angle deviation dθsd. Specifically, the automatic steering torque command value Tm* is calculated by multiplying the sum of the steering angle deviation dθs and the driver-intended steering angle deviation dθsd by the preset coefficient a as expressed by Expression (6).

$$Tm^* = a(d\theta s + d\theta sd) \quad (6)$$

The grip angle command value calculating circuit 44 calculates the grip angle command value θg* based on the grip angle θ2, the deviation dθg*, and the driver-intended grip angle θ2d. Specifically, the grip angle command value θg* is calculated in accordance with Expression (7).

$$\theta g^* = \theta 2 + d\theta g^* + \theta 2d \quad (7)$$

Figure 13:
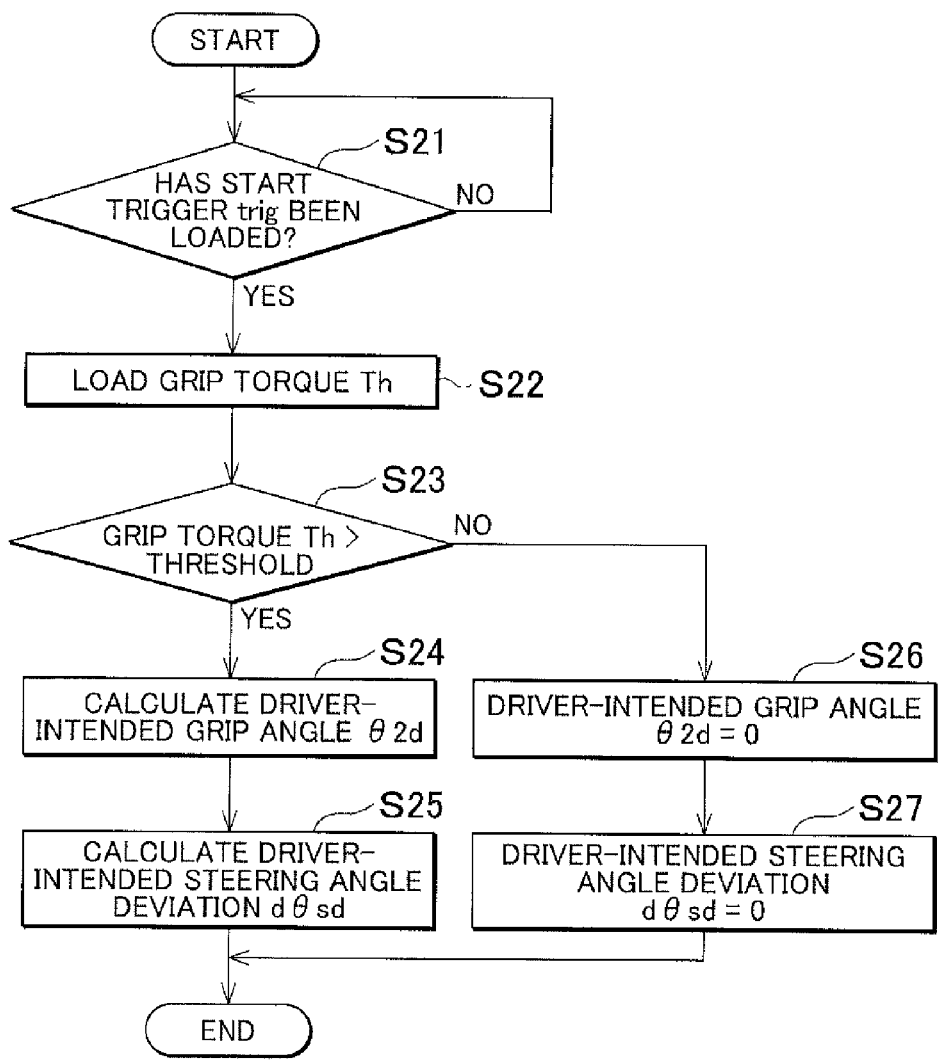
FIG. 13 is a flowchart illustrating a process procedure for calculation executed in an override calculation processing circuit in the steering system in the second embodiment.

Now, a process procedure for the calculation executed in the override calculation processing circuit 45 will be described. As illustrated in a flowchart in FIG. 13, first, the override calculation processing circuit 45 determines whether or not the start trigger trig has been loaded (step S21). If the start trigger trig has not been loaded (in step S21, NO), the override calculation processing circuit 45 repeats step S21 until the start trigger trig is loaded. If the start trigger trig has been loaded (in step S21, YES), the override calculation processing circuit 45 loads the grip torque Th detected through the grip torque sensor 52 (step S22).

The override calculation processing circuit 45 then determines whether or not the grip torque Th is higher than the threshold (step S23). The threshold is a preset value that serves as a reference for determining whether or not the driver has operated the grips 10a.

If the grip torque Th is higher than the threshold (in step S23, YES), the override calculation processing circuit 45 calculates the driver-intended grip angle θ2d (step S24) and then calculates the driver-intended steering angle deviation dθsd (step S25). Subsequently, the override calculation processing circuit 45 ends the processing.

If the grip torque Th is not higher than the threshold (in step S23, NO), the override calculation processing circuit 45 calculates the driver-intended grip angle θ2d to be zero (step S26) and then calculates the driver-intended steering angle deviation dθsd to be zero (step S27). Subsequently, the override calculation processing circuit 45 ends the processing. In this case, the grip torque Th is considered to result from a reaction from the road surface and not to be generated in accordance with the driver's intension.

Figure 14A:
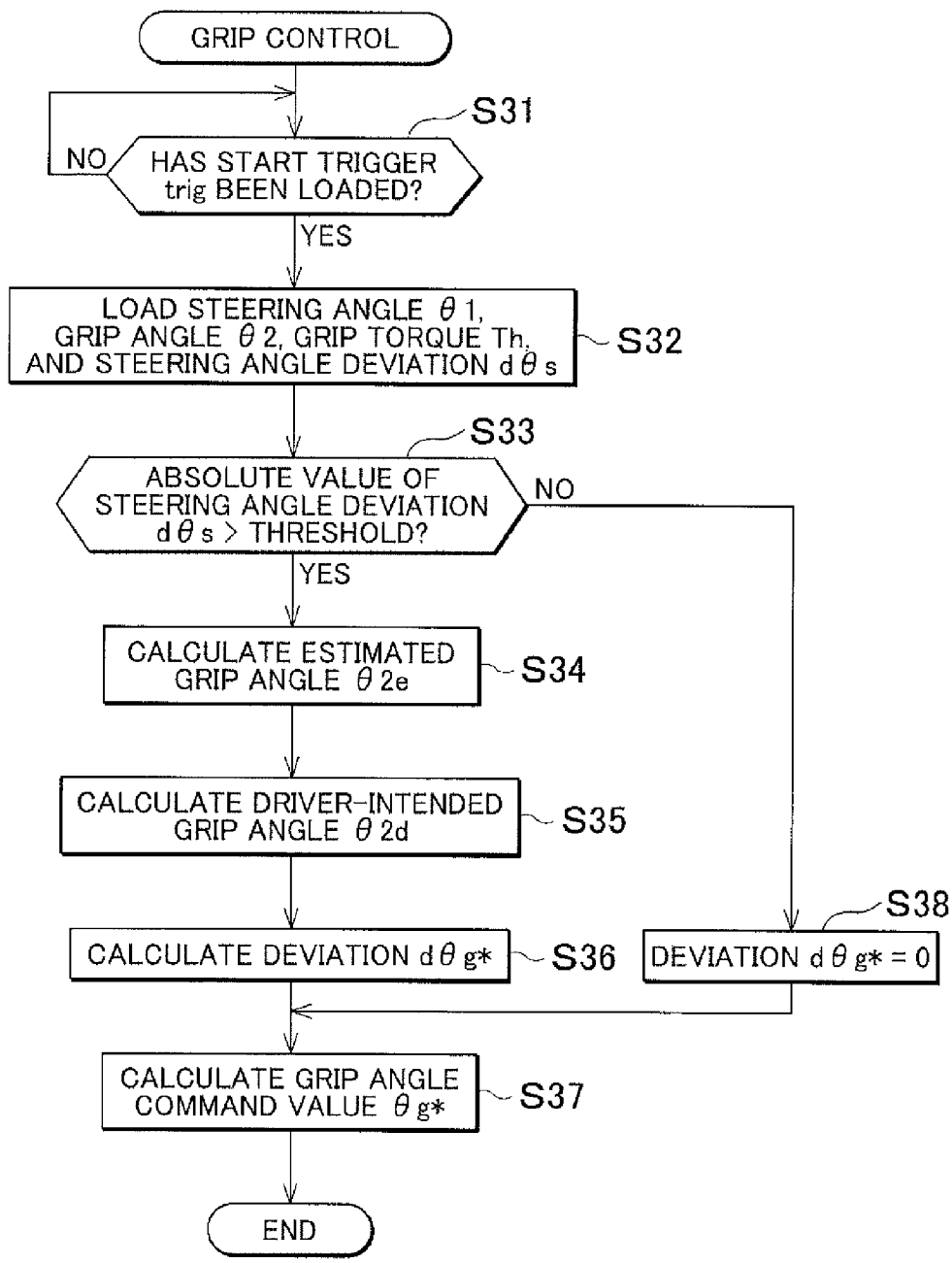
FIG. 14A is a flowchart illustrating a control procedure for the grips in the steering system in the second embodiment.

Now, a process procedure for grip control performed in the steering ECU 40 will be described. As depicted in FIG. 14A, first, the steering ECU 40 determines whether or not the start trigger trig has been loaded (step S31). If the start trigger trig has not been loaded (in step S31, NO), the steering ECU 40 repeats step S31 until the start trigger trig is loaded. If the start trigger trig has been loaded (in step S31, YES), the steering ECU 40 loads the steering angle θ1, the grip angle θ2, the steering angle deviation dθs, and the grip torque Th (step S32).

The steering ECU 40 then determines whether or not the absolute value of the steering angle deviation dθs is larger than a threshold (step S33).

If the absolute value of the steering angle deviation dθs is larger than the threshold (in step S33, YES), the steering ECU 40 (estimated grip angle calculating circuit 41) calculates the estimated grip angle θ2e (step S34).

The steering ECU 40 (driver-intended grip angle calculating circuit 45a) calculates the driver-intended grip angle θ2d (step S35).

The steering ECU 40 (deviation calculating circuit 42) calculates the corrected deviation dθg* based on the steering angle θ1, the steering angle deviation dθs, the estimated grip angle θ2e, and the driver-intended grip angle θ2d (step S36).

Finally, the steering ECU 40 (grip angle command value calculating circuit 44) calculates the grip angle command value θg* (step S37) to end the processing. In step S33 described above, if the absolute value of the steering angle deviation dθs is larger than a threshold (in step S33, NO), the steering ECU 40 (deviation calculating circuit 42) calculates the corrected deviation dθg* to be zero (step S38) to end the processing.

Figure 14B:
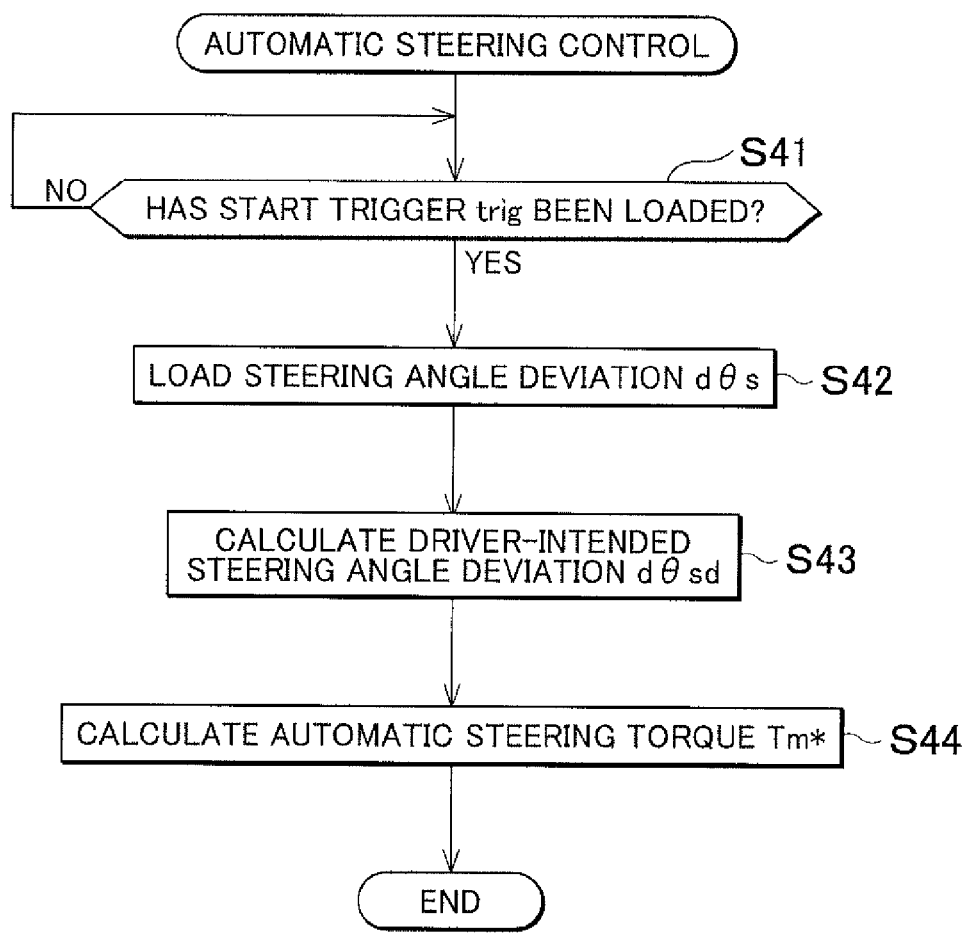
FIG. 14B is a flowchart illustrating a control procedure for automatic steering control in the steering system in the second embodiment.

Now, a process procedure for automatic steering control performed in the steering ECU 40 will be described. As depicted in FIG. 14B, first, the steering ECU 40 determines whether or not the start trigger trig has been loaded (step S41). If the start trigger trig has not been loaded (in step S41, NO), the steering ECU 40 repeats step S41 until the start trigger trig is loaded. If the start trigger trig has been loaded (in step S41, YES), the steering ECU 40 (automatic steering torque command value calculating circuit 43) loads the steering angle deviation dθs (step S42).

The steering ECU 40 (driver-intended steering angle deviation calculating circuit 45b) calculates the driver-intended steering angle deviation dθsd (step S43). The steering ECU 40 (automatic steering torque command value calculating circuit 43) calculates the automatic steering torque command value Tm* (step S44) to end the processing.

Effects of the present embodiment will be described.

(1) The steering ECU 40 calculates the grip angle command value θg* and the automatic steering torque command value Tm* and can thus execute the override processing in which, when the driver operates the grips 10a during the automatic steering, the automatic steering and the manual steering are allowed to coexist so as to reflect the driver's intension. First, the grip angle command value θg* is caused to follow the grip angle θ2 to suppress operation of the grips 10a unintended by the driver. Upon detecting the driver's operation of the grips 10a (detecting that the grip torque Th is higher than the threshold), the steering ECU 40 calculates the automatic steering torque command value Tm* and the grip angle command value θg* using the driver-intended grip angle θ2d and the driver-intended steering angle deviation dθsd. Since the automatic steering torque command value Tm* is calculated based on the steering angle deviation dθs and the driver-intended steering angle deviation dθsd, the automatic steering can be performed in accordance with the driver's operation of the grips 10a. That is, the target traveling route of the vehicle can be adjusted according to the driver's preferences.

Since the unintended operation of the grips 10a is suppressed in order to alleviate the driver's discomfort in the wrists, the override processing is not executed when the grips 10a are not actively operated as in the first embodiment. In this case, the automatic steering may be exclusively performed.

(2) The grip angle command value calculating circuit 44 of the steering ECU 40 calculates the grip angle command value θg* with the driver-intended grip angle θ2d taken into account. Consequently, operation of the grips 10a unintended by the driver can be more reliably suppressed.

The embodiments may be changed as follows. Other embodiments described below may be combined with one another without leading to technical contradiction. In the embodiments, the yaw angle θ3 is detected using the visual sensor 53, but the invention is not limited to this. For example, the yaw angle θ3 may be detected based on information from a yaw angle sensor provided in the vehicle or information from a GPS sensor. Instead of the yaw angle θ3, a traveling direction of the vehicle or information on the surroundings of the vehicle may be detected based on information from a GPS sensor or the visual sensor 53. For example, even when lane marking information on roads fails to be recognized, how the traveling direction is inclined to the straight running direction of the vehicle may be detected.

In the embodiments, the steering angle sensor 50 is provided on the column shaft 11a. However, the invention is not limited to this. For example, the steering angle sensor 50 may be provided on the steering wheel 10, the intermediate shaft 11b, or the pinion shaft 11c.

Figure 15:
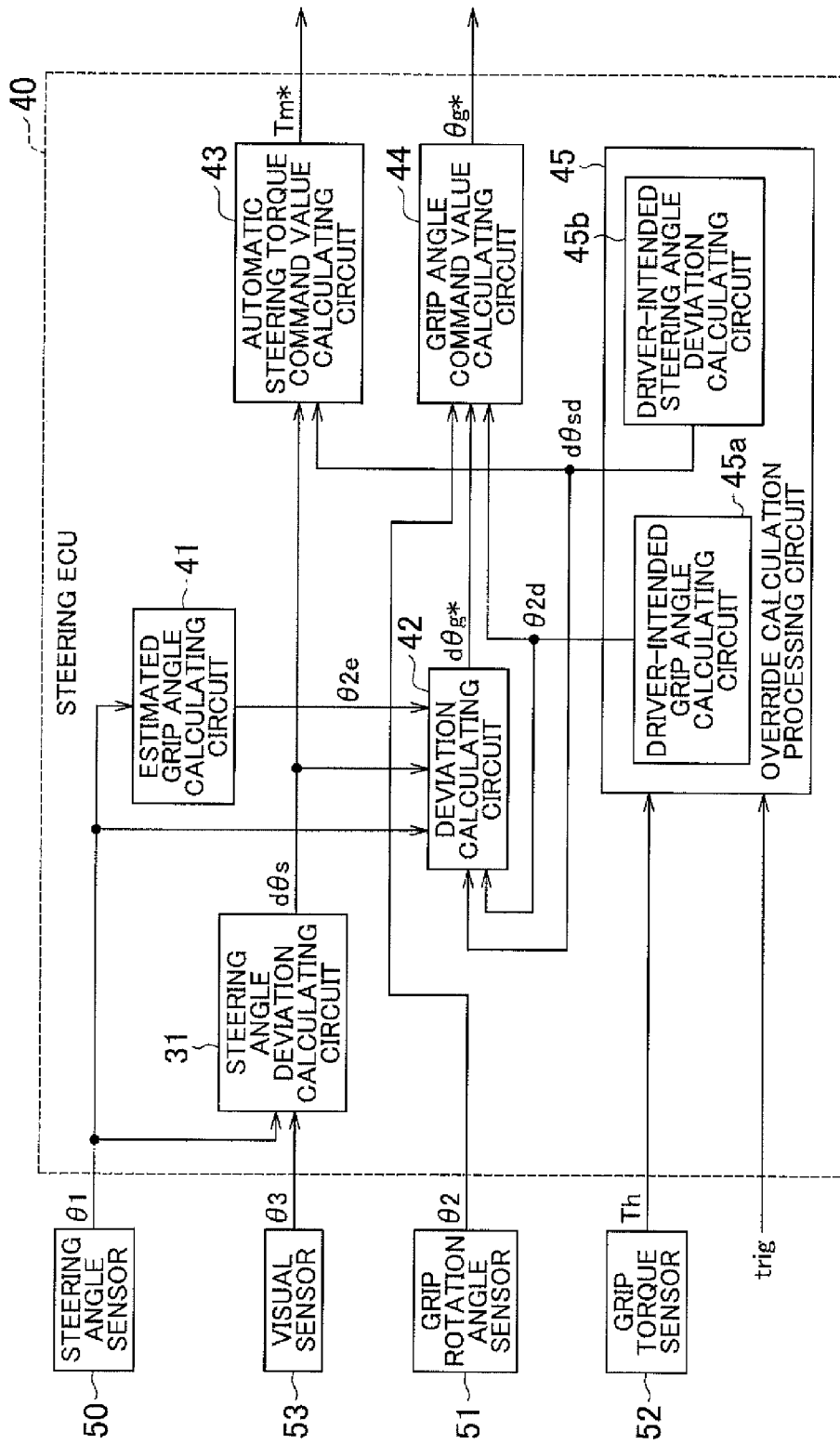
FIG. 15 is a block diagram depicting a general configuration of a steering ECU in a steering system in another embodiment.

In the embodiments, the steering angle deviation calculating circuit 31 is provided on the host ECU 30. However, the invention is not limited to this. For example, as depicted in FIG. 15, the steering angle deviation calculating circuit 31 may be provided in the steering ECU 40.

In the embodiments, when the steering angle deviation dθs is smaller than the threshold, the deviation calculating circuit 42 calculates the deviation dθg or the deviation dθg* to be zero. However, the invention is not limited to this. That is, even when the steering angle deviation dθs is smaller than the threshold, the deviation calculating circuit 42 calculates the deviation dθg or the deviation dθg* based on the steering angle θ1, the steering angle deviation dθs, and the estimated grip angle θ2e. In this case, the processing in steps S3 and S7 in FIG. 7A and in steps S33 and S38 in FIG. 14A need not be executed.

In the embodiments, when the grip torque Th is lower than the threshold, the driver-intended grip angle θ2d and the driver-intended steering angle deviation dθsd are calculated to be zero. However, the invention is not limited to this. That is, even when the grip torque Th is lower than the threshold, the driver-intended grip angle θ2d and the driver-intended steering angle deviation dθsd may be calculated based on the grip torque Th. In this case, the processing in steps S23, S26, and S27 in FIG. 13 need not be executed. In areas in FIG. 10 and FIG. 11 where the grip torque Th is lower than the threshold, the relation between the grip torque Th and the driver-intended grip angle θ2d or the driver-intended steering angle deviation dθsd may be as depicted by a dashed line.

In the embodiments, each of the grips 10a has the grip torque sensor 52. However, the invention is not limited to this. For example, when the override calculation processing is not executed as in the first embodiment, the grip torque sensor 52 need not be provided. Furthermore, the invention is not limited to the grip torque sensor 52. Any sensor may be used so long as the sensor can detect the driver's operation of the grips 10a. For example, a pressure sensor may be used. In this case, depending on the magnitude of the pressure exerted on the grips 10a when the driver grips the grips 10a, the override processing is executed which allows the automatic steering and the manual steering to coexist so as to reflect the driver's intention.

Figure 5:
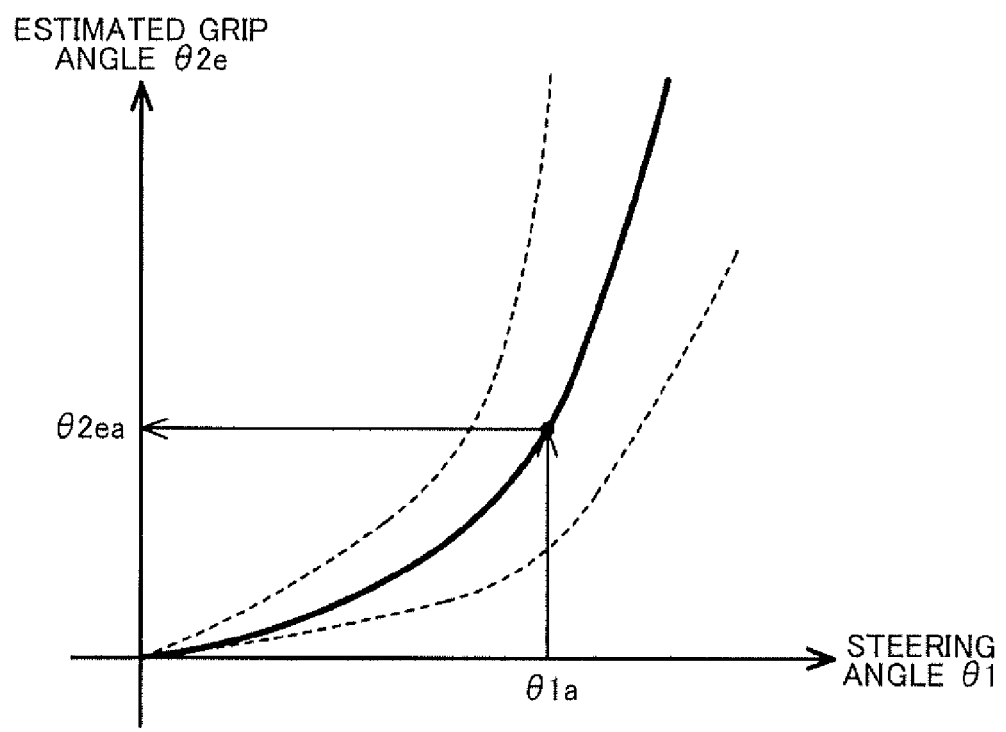
FIG. 5 is a graph illustrating a relation between a steering angle and an estimated grip angle in the steering system in the first embodiment.
Figure 6:
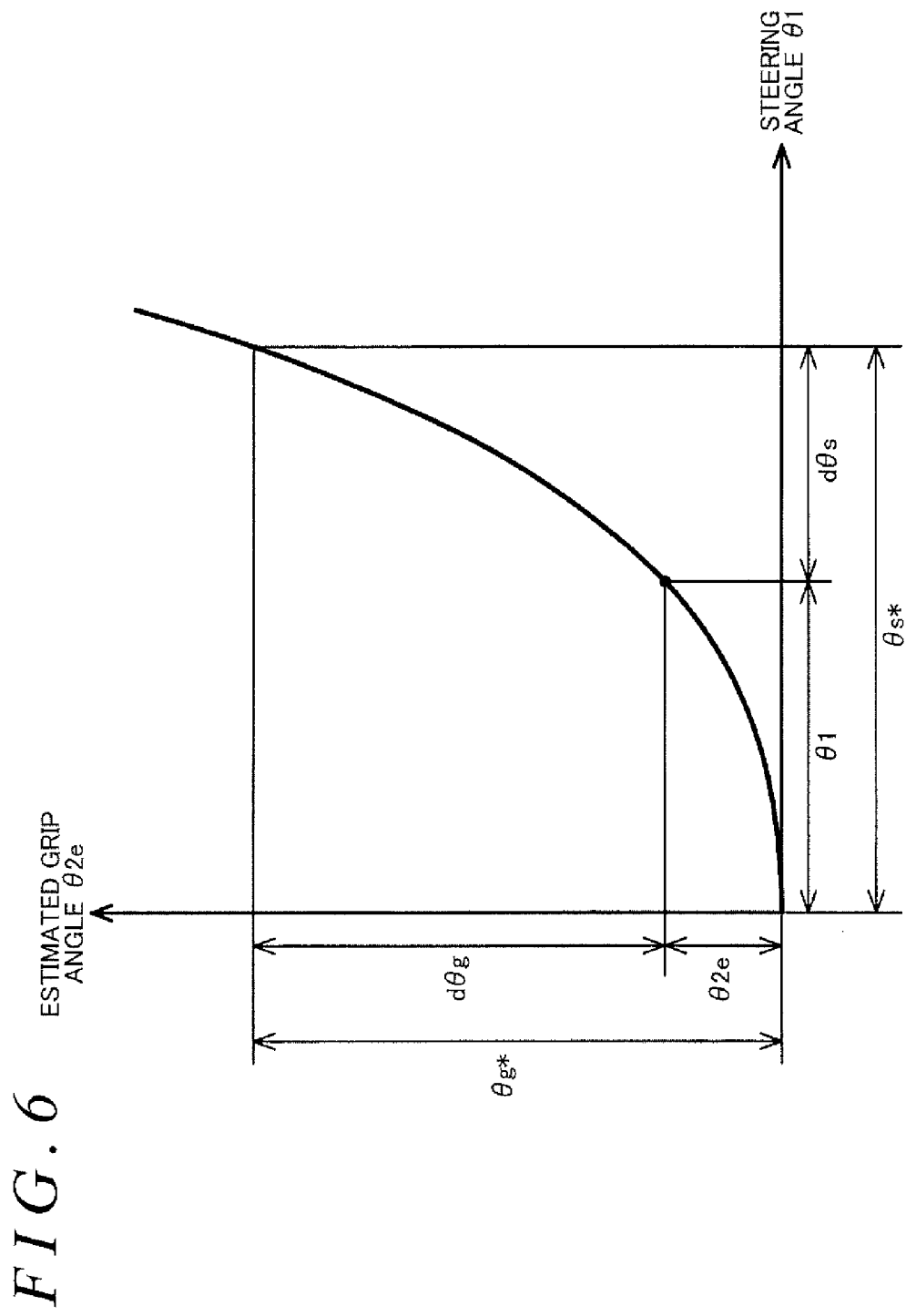
FIG. 6 is a graph used to calculate a deviation in the steering system in the first embodiment.

In the embodiments, in FIG. 5, one curve is selected from the plurality of curves indicative the relation between the steering angle θ1 and the estimated grip angle θ2e that are pre-mapped to each other. However, the invention is not limited to this. That is, one curve may be preset regardless of the vehicle velocity or the driver's physique. Instead of preparing a plurality of maps, it is possible to define the steering angle θ1 and the estimated grip angle θ2e in accordance with the driver's grip state, the driver's habit in the steering operation, and the like.

In the embodiments, one curve is selected from the plurality of curves indicative the relation between the steering angle θ1 and the estimated grip angle θ2e that are pre-mapped to each other based on the vehicle velocity or the driver's physique. However, the invention is not limited to this. For example, a curve may be selected which is closest to one point resulting from plotting of the steering angle θ1 and the grip angle θ2.

In the second embodiment, the deviation calculating circuit 42 calculates the deviation dθg* by adding or subtracting the driver-intended grip angle θ2d to or from the difference between the target grip angle θg and the estimated grip angle θ2e. However, the invention is not limited to this. For example, first, the deviation calculating circuit 42 calculates a steering angle obtained by adding or subtracting the driver intended steering angle deviation dθsd to or from the target steering angle θs, and then calculates a corrected target grip angle by using the calculated steering angle and the relation between the steering angle θ1 and the estimated grip angle θ2e. Next, the deviation dθg* is calculated based on the difference between the corrected target grip angle and the estimated grip angle θ2e. The deviation dθg* may be calculated as described above.

In the embodiments, the grips 10a are attached to the steering wheel 10, serving as the steering portion, as depicted in FIG. 2A. However, the shape of the steering portion is not limited. As depicted in FIG. 2B, for example, a shaft 10c serving as a steering portion is provided at an end of the steering shaft 11. The shaft 10c is provided orthogonally to the steering shaft 11. The shaft 10c rotates integrally with the steering shaft 11. Grips 10d, 10e are provided at both ends of the shaft 10c. The grips 10d, 10e are provided so as to be rotatable around the shaft 10c. The grips 10d, 10e may be rotated in the same direction or opposite directions.

The steering systems in the embodiments may be of any type. For example, the steering systems may be of a type that applies the rotational torque of the motor 20 to the steering shaft 11 or a type in which the motor 20 is assembled coaxially with the rack shaft 12. Alternatively, steer-by-wire (SBW) steering systems may be used in which the steering wheel 10 is mechanically separated from the rack shaft 12.

What is claimed is:

1. A steering system comprising: a steering portion that is rotationally operated by a driver; a steering mechanism that varies a steered angle of steered wheels in conjunction with operation of the steering portion; a rotation angle sensor that detects a steering angle that is a rotation angle of the steering portion; a steering operation actuator that generates power applied to the steering mechanism to steer the steered wheels; a grip attached to the steering portion and having an axis of rotation that is non-parallel to an axis of rotation of the steering portion; a grip rotation angle sensor that detects a grip angle that is a rotation angle of the grip; a grip actuator that applies a rotational torque to the grip; and a control apparatus that performs automatic steering control that steers the steered wheels by controlling the steering operation actuator in accordance with a traveling state of a vehicle and the steering angle and grip control that rotates the grip by controlling the grip actuator in accordance with the steering angle and the grip angle, wherein the control apparatus calculates, in performing the grip control during execution of the automatic steering control, a grip angle command value that is a target value of the grip angle for gripping of the grip based on the steering angle and the grip angle, and controls driving of the grip actuator so as to cause the grip angle to follow the grip angle command value.

2. The steering system according to claim 1, wherein, the control apparatus controls, in performing the automatic steering control, driving of the steering operation actuator so as to eliminate a difference between a target traveling path of the vehicle and an actual traveling path of the vehicle.

3. The steering system according to claim 1, wherein, the control apparatus has:
an estimated grip angle calculating circuit that calculates an estimated grip angle from the steering angle based on a given relation between the steering angle and the estimated grip angle, the estimated grip angle being a rotation angle of the grip estimated based on the steering angle;
a correction value calculating circuit that calculates, based on the given relation, a correction value that is used to correct a grip angle detected through the grip rotation angle sensor based on a difference between a first estimated grip angle and a second estimated grip angle, the first estimated grip angle being calculated from a sum of the difference between a target traveling path of the vehicle and an actual traveling path of the vehicle and the steering angle, the second estimated grip angle being calculated from the steering angle, and
a grip angle command value calculating circuit that calculates the grip angle command value that is a sum of the detected grip angle and the correction value.

4. The steering system according to claim 3, further comprising:
a grip torque sensor that detects a grip torque of the grip, wherein,
the control apparatus has an override calculation processing circuit that calculates an intended grip angle that is an amount of operation of the grip based on driver's intention based on the grip torque detected through the grip torque sensor, and
the correction value calculating circuit calculates a temporary correction value for the grip angle detected based on the difference between the first estimated grip angle and the second estimated grip angle, and adds or subtracts the intended grip angle to or from the temporary correction value depending on the steering angle to determine the correction value.

5. The steering system according to claim 3, further comprising:
a grip torque sensor that detects a grip torque of the grip, wherein,
the control apparatus has an override calculation processing circuit that calculates a driver's intended difference included in the difference between the target traveling path of the vehicle and the actual traveling path of the vehicle and that calculates an intended grip angle that is an amount of operation of the grip based on driver's intention based on the grip torque detected through the grip torque sensor, and
the correction value calculating circuit calculates, based on the given relation, the correction value based on a difference between the first estimated grip angle and the second estimated grip angle, the first estimated grip angle being calculated from a sum of the difference between the target traveling path of the vehicle and the actual traveling path of the vehicle, the steering angle, and the intended difference.

6. The steering system according to claim 4, wherein, the control apparatus calculates a driver's intended difference included in the difference between the target traveling path of the vehicle and the actual traveling path of the vehicle, and
calculates a command value for power of the steering operation actuator based on a sum of the difference between the target traveling path of the vehicle and the actual traveling path of the vehicle and the driver's intended difference.

\* \* \* \* \*